United States Patent
Hwang et al.

(10) Patent No.: US 7,864,269 B2
(45) Date of Patent: Jan. 4, 2011

(54) LIQUID CRYSTAL DISPLAY DEVICE SWITCHABLE BETWEEN REFLECTIVE MODE AND TRANSMISSIVE MODE BY EMPLOYING ACTIVE REFLECTIVE POLARIZER

(75) Inventors: Seong-mo Hwang, Seongnam-si (KR); Moon-gyu Lee, Suwon-si (KR); Sung Nae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 12/017,803

(22) Filed: Jan. 22, 2008

(65) Prior Publication Data

US 2008/0198294 A1 Aug. 21, 2008

(30) Foreign Application Priority Data

Feb. 16, 2007 (KR) ............... 10-2007-0016783
May 11, 2007 (KR) ............... 10-2007-0046199
Jun. 11, 2007 (KR) ............... 10-2007-0056753

(51) Int. Cl.
*G02F 1/1335* (2006.01)

(52) U.S. Cl. ............... 349/96; 349/98; 359/246; 359/247; 362/19

(58) Field of Classification Search ............. 349/96–98, 349/114–115; 359/246–247; 362/19
See application file for complete search history.

(56) References Cited

U.S. PATENT DOCUMENTS

| 3,560,955 A | 2/1971 | Hallman |
| 3,599,189 A | 8/1971 | Hadden et al. |
| 6,429,961 B1 | 8/2002 | Harary et al. |
| 6,628,355 B1 | 9/2003 | Takahara |
| 7,245,431 B2 * | 7/2007 | Watson et al. ............... 359/501 |
| 2005/0218377 A1 | 10/2005 | Lawandy |
| 2007/0278891 A1 | 12/2007 | Engquist et al. |
| 2008/0198302 A1 | 8/2008 | Cho |
| 2008/0198439 A1 | 8/2008 | Cho |
| 2008/0198440 A1 * | 8/2008 | Cho ............... 359/280 |
| 2008/0198441 A1 | 8/2008 | Cho |
| 2008/0199667 A1 | 8/2008 | Cho |

FOREIGN PATENT DOCUMENTS

| JP | 07-064118 A | 3/1995 |
| JP | 10-197844 A | 7/1998 |
| JP | 10-300931 A | 11/1998 |

(Continued)

*Primary Examiner*—David Nelms
*Assistant Examiner*—Phu Vu
(74) *Attorney, Agent, or Firm*—Sughrue Mion, PLLC

(57) ABSTRACT

A liquid crystal display (LCD) device that is switchable between a transmissive mode and a reflective mode is provided. The LCD device includes a backlight; an active reflective polarizer which operates as a reflector that reflects incident light or as a reflective polarizer that reflects light of a first polarization and transmits light of a second polarization perpendicular to the first polarization, based on whether a magnetic field is applied; and a liquid crystal panel that modulates incident light to form images. The liquid crystal panel includes a liquid crystal layer, a first polarizer that is disposed on a rear surface of the liquid crystal layer and faces the active reflective polarizer, and a second polarizer that is disposed on a front surface of the liquid crystal layer.

21 Claims, 8 Drawing Sheets

FOREIGN PATENT DOCUMENTS

| | | |
|---|---|---|
| JP | 2005-221841 A | 8/2005 |
| JP | 2006-119337 A | 5/2006 |
| KR | 10-2000-0039270 A | 7/2000 |
| KR | 10-2001-0099533 A | 11/2001 |
| KR | 10-2001-0107317 A | 12/2001 |
| KR | 10-2005-0065822 A | 6/2005 |
| KR | 10-05-02115 A | 7/2005 |
| KR | 10-2005-0069097 A | 7/2005 |

* cited by examiner

LIQUID CRYSTAL DISPLAY DEVICE SWITCHABLE BETWEEN REFLECTIVE MODE AND TRANSMISSIVE MODE BY EMPLOYING ACTIVE REFLECTIVE POLARIZER

CROSS-REFERENCE TO RELATED PATENT APPLICATION

This application claims priority from Korean Patent Application No. 10-2007-0016783, filed on Feb. 16, 2007, No. 10-2007-0046199, filed on May 11, 2007, and No. 10-2007-0056753, filed on Jun. 11, 2007, in the Korean Intellectual Property Office, the disclosures of which are incorporated herein in their entireties by reference.

BACKGROUND OF THE INVENTION

1. Field of the Invention

Apparatuses consistent with the present invention relate to a liquid crystal display (LCD) device that is switchable between a reflective mode using external light and a transmissive mode using a backlight, by employing an active reflective polarizer.

2. Description of the Related Art

Recently, as the supply of portable devices such as portable phones, personal digital assistants (PDAs), and the like has increased, display devices which can operate with low power consumption and have excellent viewing characteristics in outdoor environments are required. To meet these requirements, research on transflective LCDs having a combination of a transmissive LCD using a backlight and a reflective LCD using external ambient light has been actively conducted.

FIG. 1 is a schematic view of a transflective LCD device disclosed in U.S. Pat. No. 6,654,087. Referring to FIG. 1, the transflective LCD device includes a backlight device 20, a lower substrate 40, a liquid crystal layer 60, and an upper substrate 50. The liquid crystal layer 60 is divided into a region that reflects external light by a reflective electrode 46 included therein, and a transmissive region 43 which transmits light from the backlight device 20.

In such a configuration, half of each cell is used in a transmissive mode, and the other half of each cell is used in a reflective mode. Therefore, the resolution is reduced, and each of the modes has a reduced luminance. In addition, the reflective electrode 46 has to be included inside of liquid crystal cells, and different cell gaps, such as those satisfying the relation of $d_4=2d_3$, must be used in order to compensate for optical path differences of the transmissive mode and the reflective mode. Therefore, the manufacturing process of the transflective LCD device is complex.

FIGS. 2A and 2B are schematic views of an LCD device disclosed in U.S. Pat. No. 6,710,831. Referring to the drawings, the LCD device includes a backlight 80, a mirror assembly 70 that includes a Cholesteric liquid crystal (CLC) cell 72 and a quarter wavelength plate 74, a second polarizer 67, a liquid crystal cell 65, and a first polarizer 63. In a reflective mode using external light 61 (FIG. 2A), the CLC cell 72 functions as a mirror that selectively reflects circularly polarized light. Among the unpolarized external light 61, linearly polarized light which is transmitted through the first polarizer 63, the liquid crystal cell 65, and the second polarizer 67 is incident on the CLC cell 72 in a predetermined state of circularly polarized light due to passing through the quarter wavelength plate 74, and thus is reflected by the CLC cell 72. The reflected light is incident on the liquid crystal cell 65 in a linearly polarized light state via the quarter wavelength plate 74, and on/off states are controlled based on a voltage applied to the liquid crystal cell 65 to form images. In a transmissive mode using light from the backlight 80 (FIG. 2B), the CLC cell 72 operates to transmit all of the incident light. Unpolarized light irradiated from the backlight 80 is incident on the liquid crystal cell 65 in a linearly polarized light state via the mirror assembly 70 and the second polarizer 67, and on/off states are controlled based on a voltage applied to the liquid crystal cell 65 to form images.

In such a configuration, the properties of the CLC cell are sensitive to the angle of incidence or the wavelength of incident light, so that in order to obtain reflectance properties with respect to a total visible light region, multi-layers are needed. In addition, a glass substrate used to form a CLC cell and a quarter wavelength plate used for linear polarization conversion are required. Therefore, there are limits to reducing the thickness and manufacturing costs of LCD devices. In addition, the CLC cell has a high turn-on voltage, so that there are also limits in reducing the power consumption.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a switchable LCD device that has a simple structure by employing an active reflective polarizer controlled by a magnetic field, and obtains maximum performance regardless of an environment of use because all of the liquid crystal cells can be selectively used in a transmissive mode or a reflective mode.

According to an aspect of the present invention, there is provided an LCD device that is switchable between a reflective mode and a transmissive mode. The switchable LCD device includes a backlight; an active reflective polarizer which acts as a reflector or a reflective polarizer based on whether a magnetic field is applied; and a liquid crystal panel which modulates incident light to form images. The liquid crystal panel includes a liquid crystal layer and a first polarizer and a second polarizer that are disposed at opposite sides of the liquid crystal layer.

The active reflective polarizer may act as a reflective polarizer which reflects light of a first polarization and transmits light of a second polarization perpendicular to the first polarization from light incident from the backlight when a magnetic field is applied therein, and the active reflective polarizer may act as a reflector which reflects light incident from the outside when a magnetic field is not applied therein.

Of the first and second polarizers, a transmission axis of the polarizer which faces the active reflective polarizer may be parallel with a polarization direction of light which is transmitted through the active reflective polarizer.

A reflecting member may be positioned at a rear surface of the backlight, and the reflecting member may reflect light that is reflected from the active reflective polarizer back to the active reflective polarizer. A recycle member may be disposed on the reflecting member, and the recycle member may recycle light reflected from the active reflective polarizer.

The recycle member may comprise a polarization conversion member.

The active reflective polarizer may include a magnetic material layer of conductive and soft magnetic materials, in which when an external magnetic field is applied to the magnetic material layer, magnetic moments are arranged in the same direction, and when no external magnetic field is applied, the magnetic moments are randomly arranged. The active reflective polarizer may also include a magnetic field applying means for applying a magnetic field to the magnetic material layer.

The switchable LCD device may include a control unit which controls the magnetic field applying means to operate simultaneously with the backlight.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
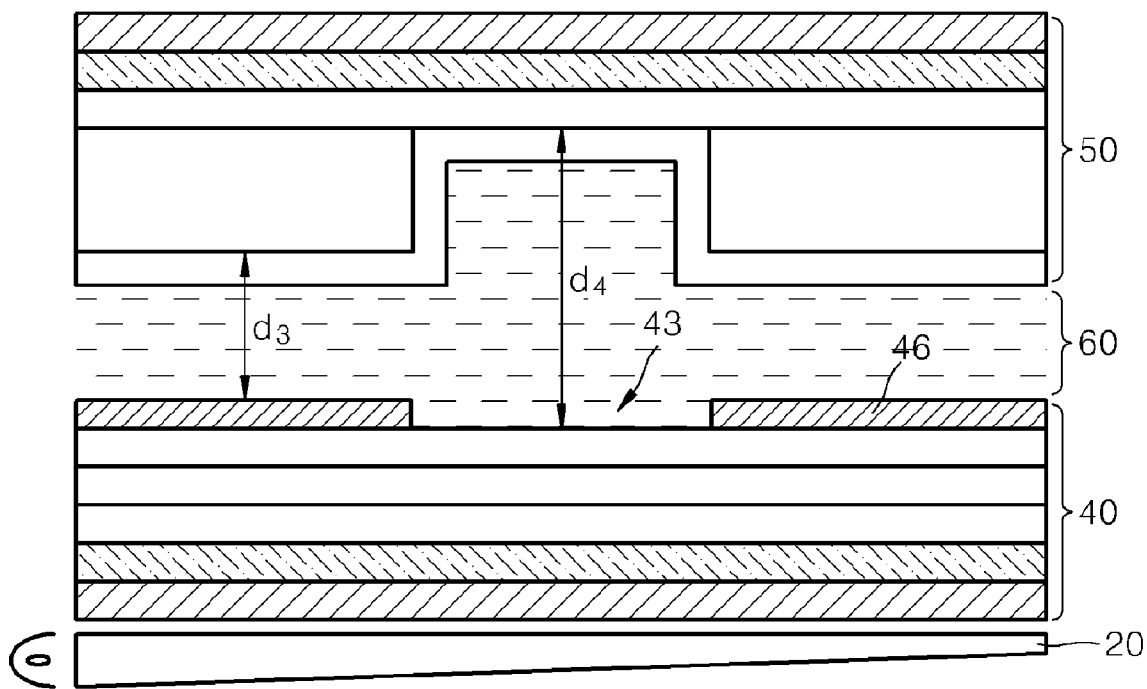
FIG. 1 is a schematic diagram of a transflective LCD device disclosed in U.S. Pat. No. 6,654,087.
Figure 2A:
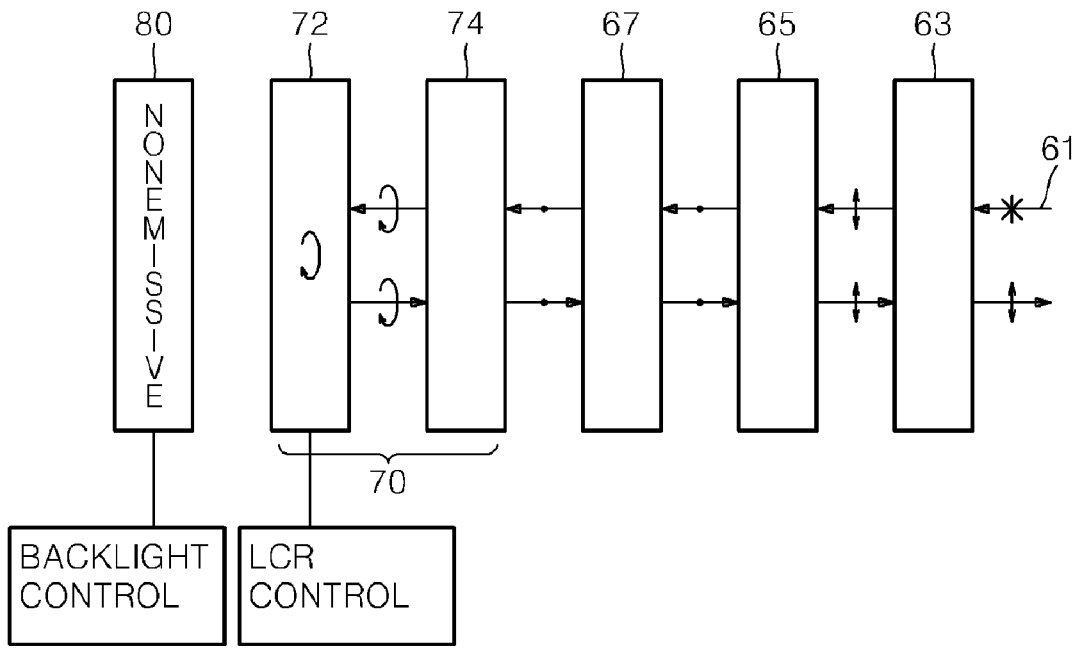
FIGS. 2A and 2B are schematic diagrams of an LCD device disclosed in U.S. Pat. No. 6,710,831.
Figure 2B:
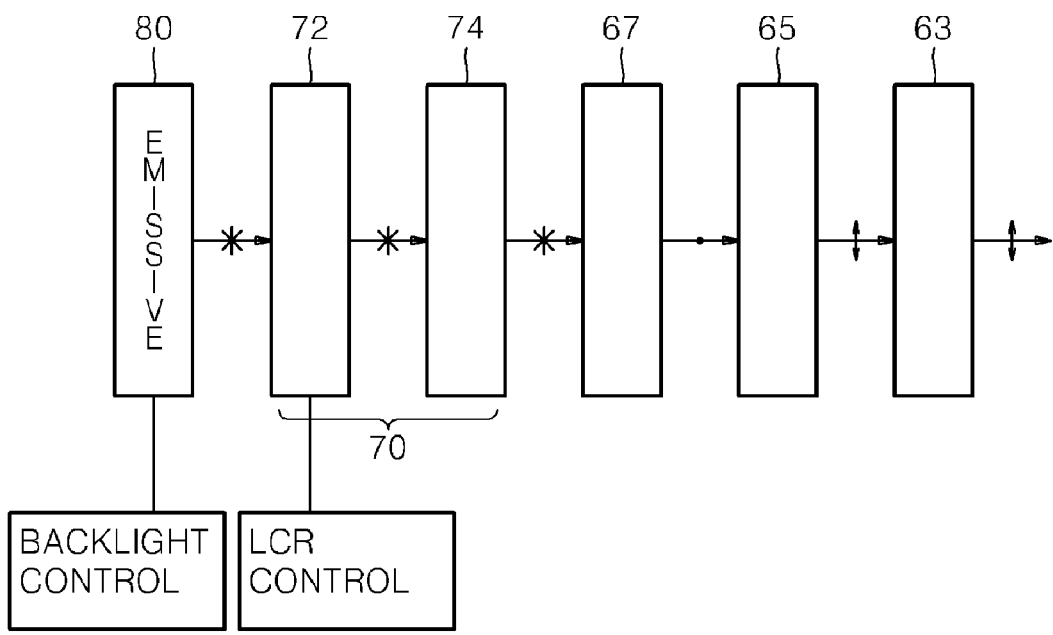

Hereinafter, a switchable LCD device according to an exemplary embodiment of the present invention will be described more fully with reference to the accompanying drawings.

FIGS. 3A, 3B, 4A, and 4B are schematic views of a switchable LCD device according to an exemplary embodiment of the present invention. Referring to the drawings, a switchable LCD device 500 includes a backlight 100, an active reflective polarizer 200, and a liquid crystal panel 300.

The active reflective polarizer 200 is controlled through an applied magnetic field to be switchable between a reflector that reflects incident light and a reflective polarizer which reflects incident light having a magnetic field component in a first direction and transmits the incident light having a magnetic field component in a second direction, the second direction being perpendicular to the direction of the applied magnetic field. When the magnetic field is not applied, the active reflective polarizer 200 is not magnetized. When a magnetic field is applied, the active reflective polarizer 200 is magnetized in a predetermined direction. For example, the active reflective polarizer 200 can have a value M in an X direction. Detailed configurations and functions of the active reflective polarizer 200 will be described later.

When the active reflective polarizer 200 functions as a reflector without applying a magnetic field therein, images are formed using external light, and light from the backlight 100 is not needed. When the active reflective polarizer 200 functions as a reflective polarizer by applying a magnetic field therein, the light from the backlight 100 is used. For this, the switchable LCD device 500 can include a control unit 410 which simultaneously controls the driving of the backlight 100 and the application of a magnetic field which controls the active reflective polarizer 200.

In addition, a reflecting member 120 may be positioned at a rear surface of the switchable LCD device 500. When the active reflective polarizer 200 acts as a reflective polarizer, the reflecting member 120 reflects light from the active reflective polarizer 200 back to the active reflective polarizer 200. A recycle member may also be disposed on the reflecting member 120. The recycle member recycles light with polarization which otherwise cannot be transmitted through the active reflective polarizer 200 and is therefore reflected therefrom. The recycle member may include a polarization conversion member 130, such as a quarter wavelength plate.

A liquid crystal panel 300 modulates light to form images. The liquid crystal panel 300 includes a liquid crystal layer 350 encapsulated between glass substrates 330 and 370, a first polarizer 310 that is disposed at a rear surface of the liquid crystal layer 350 and faces the active reflective polarizer 200, and a second polarizer 390 disposed at a front surface of the liquid crystal layer 350. In addition, the liquid crystal panel 300 includes a color filter used to form a color light, or a pixel electrode used to control each pixel. The liquid crystal layer 350 maintains the polarization state of incident light, or converts the polarization of incident light to an orthogonal polarization, based on the applied voltage. In the following description, liquid crystals of the liquid crystal layer 350 are aligned in a vertical alignment (VA) mode. A polarization state of light transmitted to the liquid crystal layer 350 is maintained when no voltage is applied to the liquid crystal layer 350. On the other hand, the polarization of light transmitted through the liquid crystal layer 350 is converted to an orthogonal polarization when a voltage is applied to the liquid crystal layer 350. However, this is only for illustrative purposes. Other liquid crystal modes can be employed, and other functions are possible based on the employed liquid crystal modes. The liquid crystal layer 350 uses linearly polarized light, so the first polarizer 310 is disposed at the rear surface of the liquid crystal layer 350. In addition, the second polarizer 390 is disposed at the front surface of the liquid crystal layer 350. Transmission axes of the first polarizer 310 and the second polarizer 390 can be perpendicular to each other. For example, the first polarizer 310 transmits light of a first polarization polarized in a first direction (X direction) and absorbs the residual light. The second polarizer 390 transmits light of a second polarization polarized in a second direction (Y direction) and absorbs the residual light. However, this is only for illustrative purposes. The transmission axes of the first polarizer 310 and the second polarizer 390 may be along the same direction, based on the liquid crystal mode.

In addition, a transmission axis of the first polarizer 310 on which light transmitted through the active reflective polarizer 200 is incident is along the same direction as that of the polarization of light transmitted through the active reflective polarizer 200.

The operation of the switchable LCD device 500 in a reflective mode using external light and a transmissive mode using light from the backlight 100 will now be described.

Figure 3A:
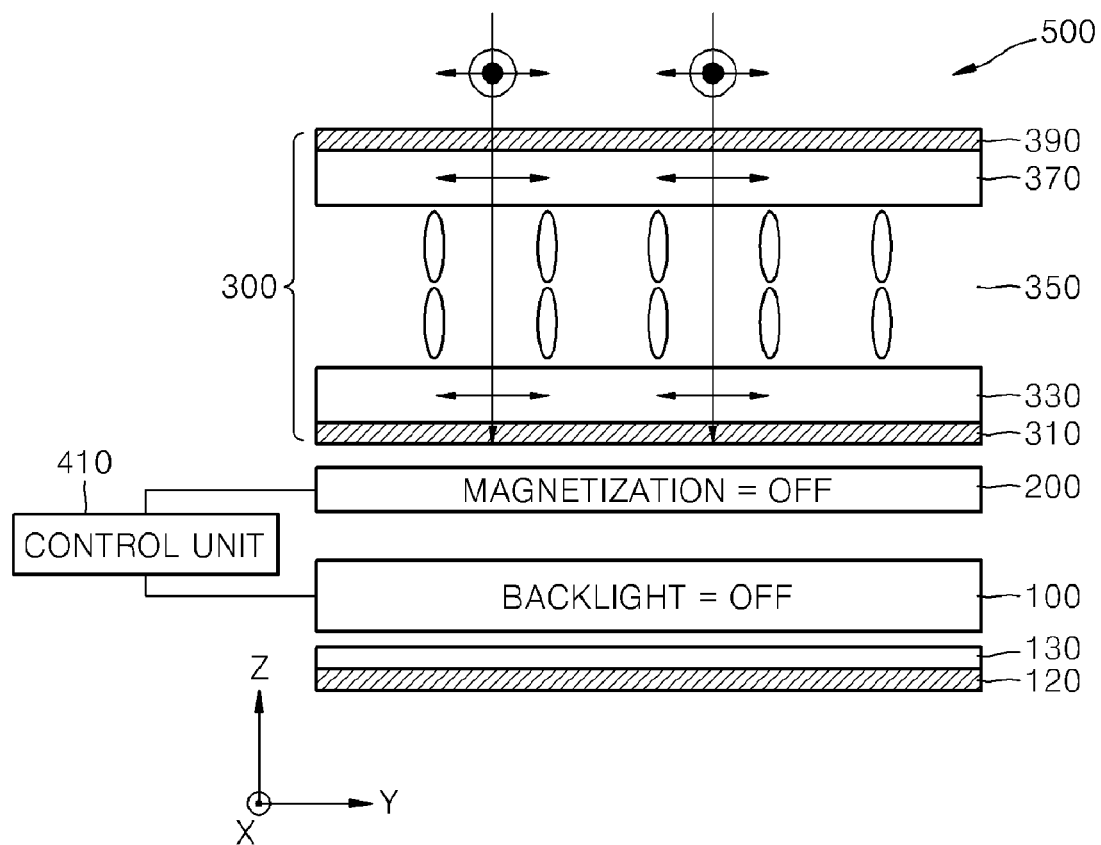
FIGS. 3A, 3B, 4A, and 4B are schematic views of a switchable LCD device according to an exemplary embodiment of the present invention, and show a light path when the switchable LCD device operates in a reflective mode and a transmissive mode.
Figure 3B:
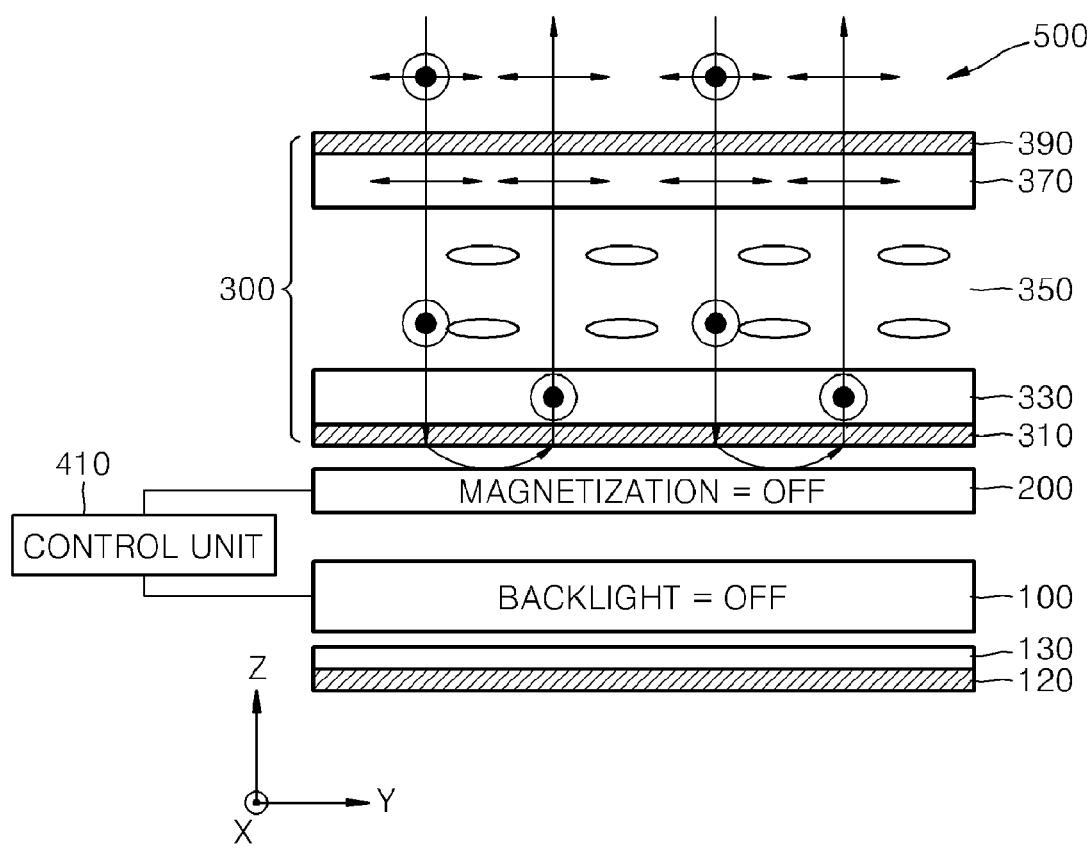

FIGS. 3A and 3B show paths of light in a pixel off-state and a pixel on-state, respectively, when a switchable LCD device according to an exemplary embodiment of the present invention operates in a reflective mode. The reflective mode uses external light to form images, wherein the images are formed by reflecting or absorbing incident external light. In such a circumstance, the control unit 410 controls the backlight 100 to be in an off state, and controls a magnetization of the active reflective polarizer 200 to be unmagnetized by not applying a magnetic field therein. Accordingly, the active reflective polarizer 200 acts as a reflector, and its detailed operation will be described later. Referring to FIG. 3A, light incident from the front surface of the liquid crystal panel 300 is unpolarized, and becomes light of the second polarization polarized in the second direction (Y direction) after the light is transmitted through the second polarizer 390. At this time, no voltage is applied to the liquid crystal layer 350, so that the polarization state of light transmitted through the liquid crystal layer 350 is maintained. That is, the light of the second polarization incident on the liquid crystal layer 350 maintains the second polarization state, and is incident on the first polarizer 310. The first polarizer 310 does not transmit this light of second polarization. Rather, the first polarizer 310 absorbs it to realize a pixel off-state. FIG. 3B shows the case when a voltage is applied to the liquid crystal layer 350. By the application of a voltage, the polarization of light incident on the liquid crystal layer 350 is converted to an orthogonal polarization. That is, light of the second polarization transmitted through the second polarizer 390 is converted to light of the first polarization when it is transmitted through the liquid crystal layer 350. Therefore, the light of the first polarization is transmitted through the first polarizer 310, and is incident on the active reflective polarizer 200. At this time, a magnetic field is not applied in the active reflective polarizer 200, thus the active reflective polarizer 200 is not magnetized. In this case, the active reflective polarizer 200 acts as a reflector which reflects incident light regardless of its polarization. Therefore, the incident light of the first polarization is reflected towards the liquid crystal panel 300, and the reflected light is transmitted through the first polarizer 310. In addition, when the light transmitted through the first polarizer 310 is transmitted through the liquid crystal layer 350, it is converted to light of the second polarization. Accordingly, the light of the second polarization is transmitted through the second polarizer 390 to realize a pixel on-state.

Figure 4A:
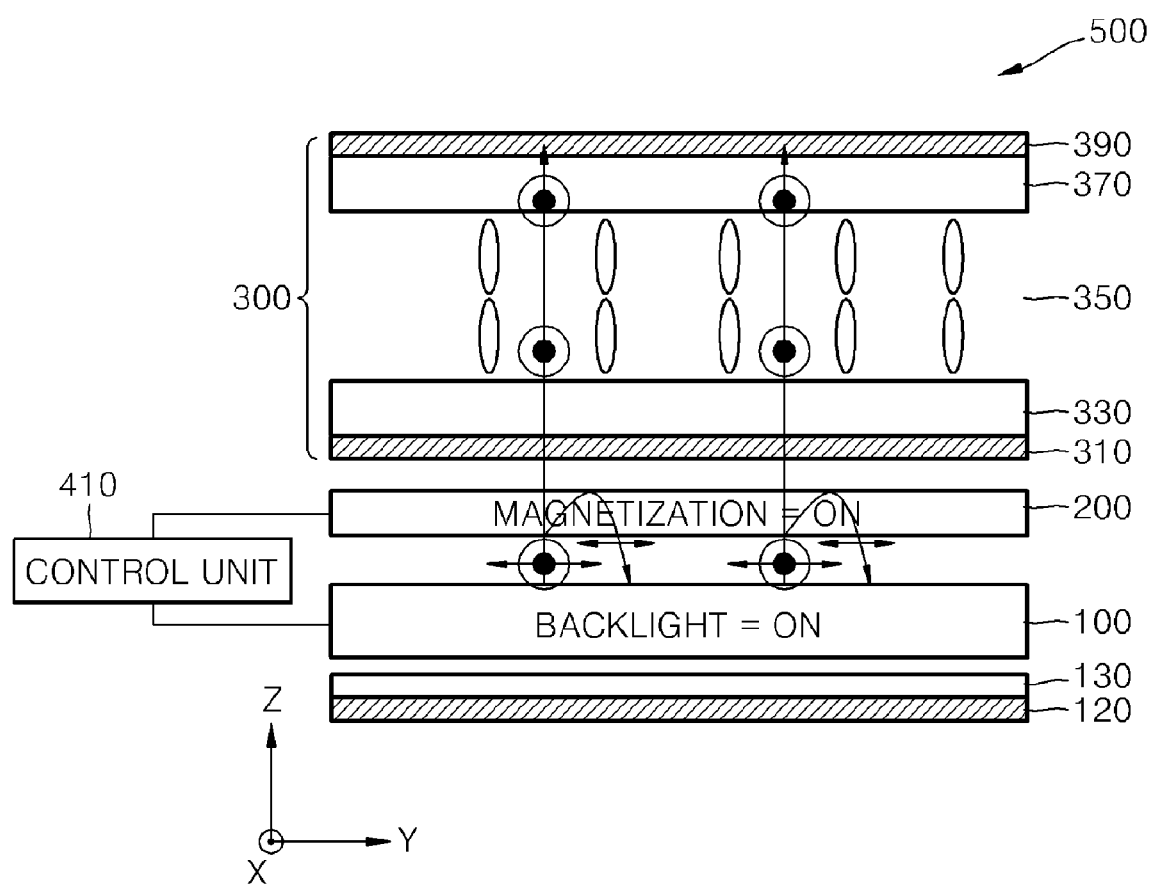
Figure 4B:
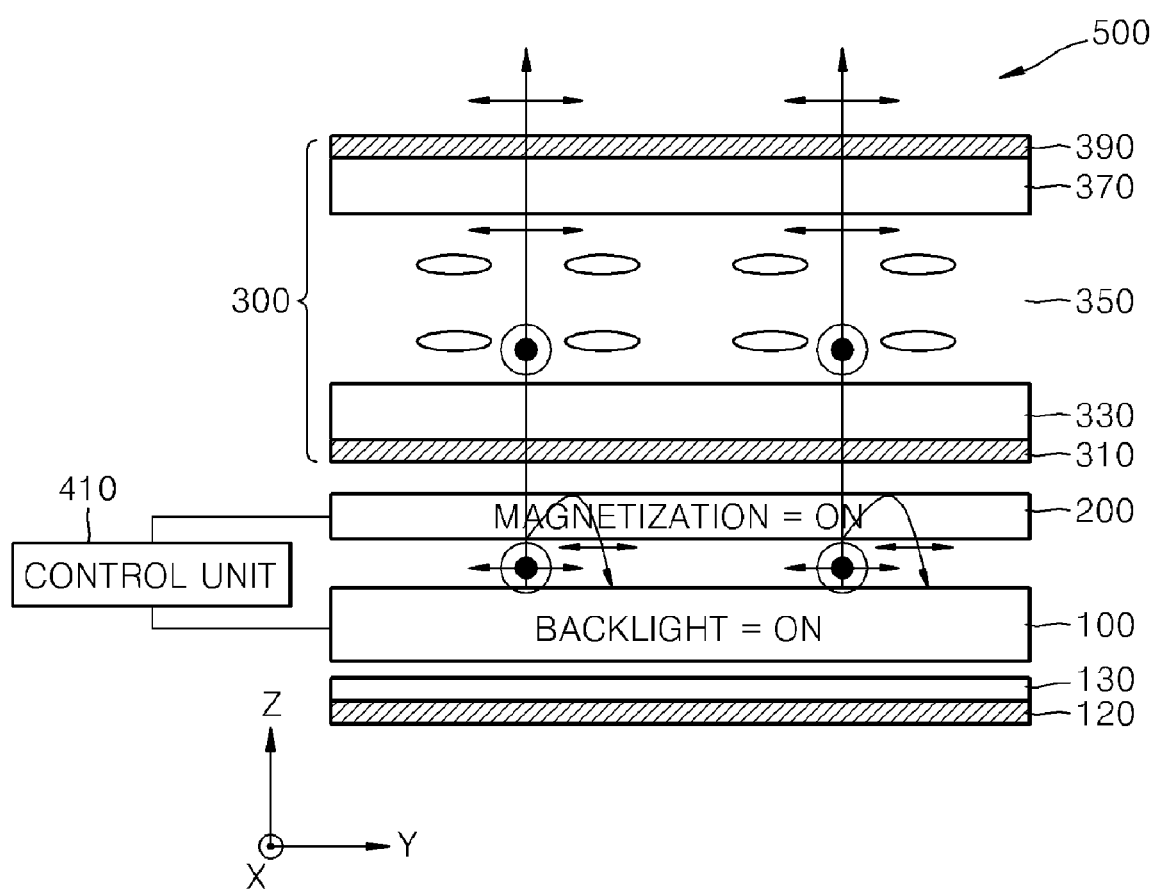
Figure 5:
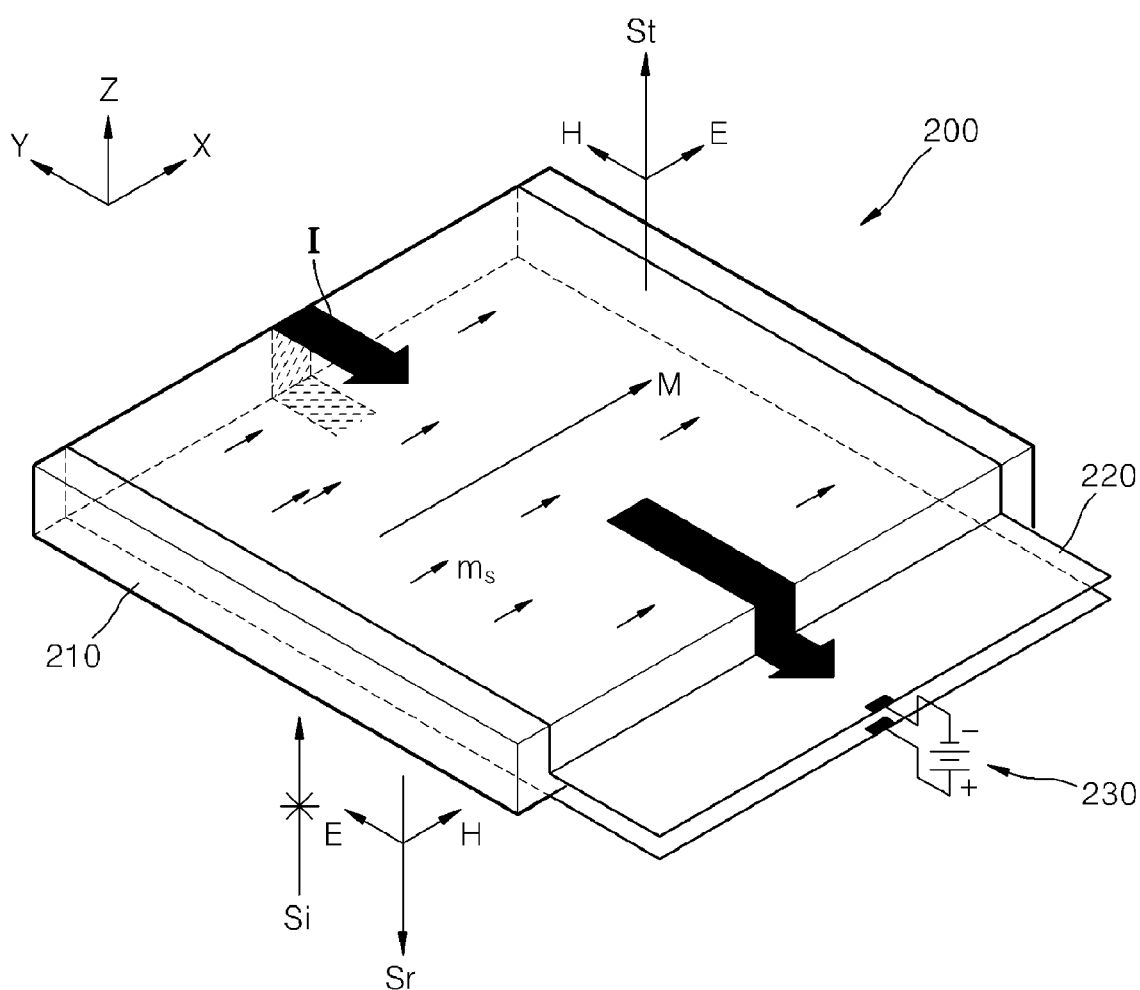
FIG. 5 is a schematic view of an active reflective polarizer used in a switchable LCD device according to an exemplary embodiment of the present invention.

FIGS. 4A and 4B show paths of light in a pixel-off state and a pixel on-state, respectively, when a switchable LCD device according to an exemplary embodiment of the present invention operates in a transmissive mode. The transmissive mode uses light from the backlight 100 to form images, wherein the images are formed by transmitting or blocking the light from the backlight 100. In this mode, the control unit 410 controls the backlight 100 to be in an on state for providing light, and applies a magnetic field in the active reflective polarizer 200 to form a magnetization in the active reflective polarizer 200. Accordingly, the active reflective polarizer 200 acts as a reflective polarizer, and its detailed operation will be described later. Referring to FIG. 4A, unpolarized light generated by the backlight 100 is incident on the active reflective polarizer 200. At this time, the active reflective polarizer 200 is magnetized in an X direction. Therefore, light having a magnetic field component H in the X direction is reflected by the active reflective polarizer 200. The direction of a magnetic field component H is perpendicular to the direction of an electric field component E (FIG. 5). Because the direction of E component is usually referred to as the polarization direction, the light having a magnetic field component H in the X direction may be referred to as light of second polarization polarized in the Y direction. In contrast, light having a magnetic field component H in the Y direction is transmitted through the active reflective polarizer 200. Similarly, this light having a magnetic field component H in the Y direction may be referred to as light of first polarization polarized in the X direction. The light of the second polarization is reflected from the active reflective polarizer 200, and then proceeds to the backlight 100, and is reflected by the reflecting member 120. In addition, a polarization direction of the reflected light is converted to a polarization which can be transmitted through the active reflective polarizer 200 by the polarization conversion member 130, and thus can be recycled. The light of the first polarization is transmitted through the first polarizer 310 whose transmission axis is formed in an X direction, and maintains the same polarization state when transmitted through the liquid crystal layer 350 with no voltage applied. Therefore, the light of the first polarization cannot be transmitted through the second polarizer 390 whose transmission axis is formed in a Y direction, and a pixel off-state is realized. Referring to FIG. 4B, light of the first polarization of unpolarized light generated by the backlight 100 is incident on the liquid crystal layer 350. At this time, voltage is applied to the liquid crystal layer 350, and the polarization of the light transmitted through the liquid crystal layer 350 is converted to an orthogonal polarization. Therefore, the light of the first polarization is converted to light of the second polarization. Accordingly, the light of the second polarization is transmitted through the second polarizer 390 to realize a pixel on-state.

Hereinafter, the active reflective polarizer 200 used in the switchable LCD device 500 according to exemplary embodiments of the present invention will be described.

FIG. 5 is a schematic view of an active reflective polarizer used in a switchable LCD device according to an exemplary embodiment of the present invention.

Referring to FIG. 5, the active reflective polarizer 200 includes a magnetic material layer 210 and a magnetic field applying means for applying a magnetic field to the magnetic material layer 210. The magnetic field applying means may include a flat transparent electrode 220 that is disposed around the magnetic material layer 210, and an electric source 230 for supplying current to the transparent electrode 220. The transparent electrode 220 may be formed of indium tin oxide (ITO). The transparent electrode 220 may surround the magnetic material layer 210 as illustrated in FIG. 5, and may be formed on an upper surface or a lower surface of the magnetic material layer 210. That is, the magnetic field applying means can have any configuration that can magnetize the magnetic material layer 210 in a predetermined direction. For example, the magnetic field applying means may include a plurality of wires that surround the magnetic material layer 210 at regular intervals, and an electric source for supplying current to the plurality of wires. The wires may surround the magnetic material layer 210, and can also be disposed on an upper surface or a lower surface of the magnetic material layer 210.

The magnetic material layer 210 comprises a magnetic material such that magnetic moments are arranged in one direction when an external magnetic field is applied thereto, and magnetic moments are randomly arranged when the external magnetic field is not applied thereto. The magnetic material has spontaneously magnetized magnetic moments $m_s$. Magnetic moments $m_s$ are arranged in a random direction with no application of an external magnetic field, and thus a net magnetization M of the magnetic material layer 210 becomes 0. A path of light incident on the magnetic material layer 210 under which an external magnetic field is not applied will now be described. Light, which is an electromagnetic wave, cannot pass through a medium having a thickness greater than a skin depth. The skin depth refers to the depth where an amplitude of an incident electromagnetic wave is reduced to 1/e. The skin depth is determined by the wavelength of the incident light, as well as the magnetic permeability and conductivity of the medium. As the magnetic permeability and conductivity increase, the skin depth decreases. This can be described by the fact that polarized light in which a magnetic field component H of the incident light is in the same direction as a direction of arranged magnetic moments, is reflected by the magnetic moment $m_s$. That is, unpolarized light $S_i$ incident on the magnetic material layer 210 can be divided into polarization components having magnetic field components H in random directions. As each of the polarization components proceeds along the depth direction of the magnetic material layer 210, it meets a magnetic moment that faces the same direction as the H component, and is reflected by the magnetic moment. Therefore the light cannot pass through the magnetic material layer 210, and all of the light is reflected. That is, the incident unpolarized light cannot pass through the magnetic material layer 210, and is reflected as unpolarized light, regardless of its polarization components.

On the other hand, as illustrated in FIG. 5, when current I is supplied to the transparent electrode 220 by the electric source 230, most of the magnetic moments $m_s$ in the magnetic material layer 210 are aligned along one direction. The magnetic material layer 210 then has a net magnetization of M in an X direction. In this case, of unpolarized incident light $S_i$, light having a magnetic field component H in an X direction (Sr) is reflected by magnetic moments $m_s$ of the same direction. However, light having a magnetic field component H in an Y direction (St) does not meet magnetic moments $m_s$ in the same direction while the light is passing through the magnetic material layer 210, and thus is transmitted through the magnetic material layer 210. In such a manner, the magnetic material layer 210 having a magnetization M in one direction has polarization separation properties such that it reflects light having a magnetic field component H in the same direction of the magnetization M, and transmits light having a magnetic field component H in a direction perpendicular to the direction of the magnetization M. As illustrated in FIG. 5, the direction of magnetic field component H and that of electric field component E are perpendicular to each other. The direction of E component is usually referred to as the polarization direction of light.

The magnetic material layer 210 may comprise a soft magnetic material such that when an external magnetic field is applied, the magnetic moments are arranged in a direction of the external magnetic field, and when the applied external magnetic field disappears, the magnetic moments are randomly arranged. In addition, the thickness of the magnetic material layer 210 may be at least the skin depth of the magnetic material layer 210 with respect to the incident light. As the magnetic permeability and conductivity increase, the skin depth decreases. Therefore, the magnetic material layer 210 may comprise conductive and soft magnetic materials. Examples of the materials include titanium, cobalt, iron, cobalt-platinum, and iron-oxide.

Figure 6:
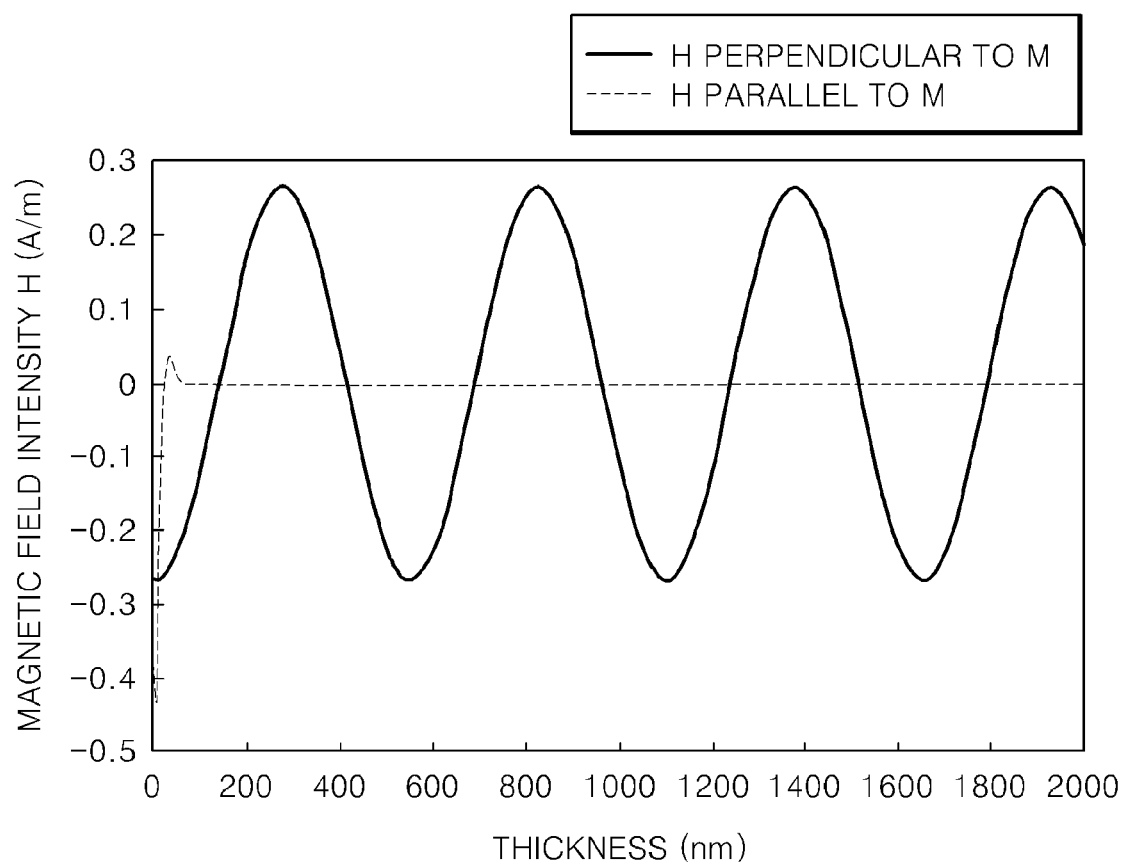
FIG. 6 is a graph showing the variation of a magnetic field intensity with respect to the thickness of a magnetic material layer of an active reflective polarizer when a component H of incident light is parallel to a direction of magnetization M, and when a component H of incident light is perpendicular to a direction of magnetization M.

FIG. 6 is a graph showing the variation of a magnetic field intensity with respect to the thickness of a magnetic material layer of an active reflective polarizer when a magnetic field component H of the incident light is parallel to a direction of the magnetization M and a magnetic field component H of the incident light is perpendicular to a direction of the magnetization M. Herein, the incident light has a wavelength of about 550 nm, and the magnetic material layer 210 comprises titanium. Titanium has a magnetic susceptibility of $18 \times 10^{-5}$ at room temperature and an electrical conductivity of $2.38 \times 10^6$ S (siemens). Referring to FIG. 6, for light having a magnetic field component H perpendicular to a magnetization direction of the magnetic material layer 210, a change of an amplitude of a magnetic field intensity with respect to the thickness of the magnetic material layer 210 is relatively small. On the other hand, for light having a magnetic field component H parallel to the magnetization direction of the magnetic material layer 210, an amplitude of a magnetic field intensity is significantly reduced based on the thickness of the magnetic material layer 210, and approaches 0 at about 60 nm. Therefore, when the magnetic material layer 210 comprises titanium and has a thickness of at least about 60 nm, nearly complete polarization separation with respect to light having a wavelength of 550 nm is possible.

A more detailed configuration of the active reflective polarizer 200 is described in Korean Patent Application No. 2007-0046199 of the present applicant. Referring to the '199 application, as the thickness of the magnetic material layer 210 increases, the polarization extinction ratio increases. In addition, when the thickness of the magnetic material layer 210 is small, the polarization separation properties are excellent.

The switchable LCD device 500 according to exemplary embodiments of the present invention is operable in a reflective mode using external light and a transmissive mode using light from the backlight 100 using the active reflective polarizer 200 having the functions described above.

As described above, in the LCD device according to exemplary embodiments of the present invention, all of the liquid crystal cells are selectively switchable between a transmissive mode and a reflective mode using an active reflective polarizer.

Accordingly, all of the liquid crystal cells are used in both the reflective mode using external light and the transmissive mode using light from a backlight, so that a display device having no reduction in resolution and excellent luminance properties can be obtained. The display device has improved viewing characteristics in outdoor environments and operates with minimum power consumption, and thus can be employed for use in more competitive mobile devices.

While the present invention has been particularly shown and described with reference to exemplary embodiments thereof, it will be understood by those of ordinary skill in the art that various changes in form and details may be made therein without departing from the spirit and scope of the present invention as defined by the following claims and their legal equivalents.

What is claimed is:

1. A switchable liquid crystal display device comprising:
   an active reflective polarizer switchable between a reflector and a reflective polarizer based on whether a magnetic field is applied in the active reflective polarizer; and
   a liquid crystal panel disposed adjacent to the active reflective polarizer.

2. The switchable liquid crystal display device of claim 1, wherein
   if the magnetic field is applied in the active reflective polarizer in a direction, the active reflective polarizer operates as the reflective polarizer reflecting the incident light having a magnetic field component in a first direction and transmits the incident light having a magnetic field component in a second direction, the second direction being perpendicular to the direction of the magnetic field, and
   if the magnetic field is not applied in the active reflective polarizer, the active reflective polarizer operates as the reflector reflecting substantially all of the incident light.

3. The switchable liquid crystal display device of claim 2, wherein the liquid crystal panel comprises a liquid crystal layer, and a first polarizer and a second polarizer disposed at opposite sides of the liquid crystal layer and a transmission axis of the first polarizer facing the active reflective polarizer is parallel with the second direction.

4. The switchable liquid crystal display device of claim 1 further comprising a backlight emitting light and a reflecting member reflecting a portion of the emitted light reflected by the active reflective polarizer back towards the active reflective polarizer.

5. The switchable liquid crystal display device of claim 4, further comprising a recycle member disposed on the reflecting member and recycling the emitted light reflected by the active reflective polarizer.

6. The switchable liquid crystal display device of claim 5, wherein the recycle member comprises a polarization conversion member.

7. The switchable liquid crystal display device of claim 1, wherein the active reflective polarizer comprises:
 a magnetic material layer, wherein if the magnetic field is applied to the magnetic material layer, magnetic moments contained within the magnetic material layer are uniformly arranged in a same direction, and if the magnetic field is not applied to the magnetic material layer, the magnetic moments are not uniformly arranged in the same direction; and
 a magnetic field applying means for applying the magnetic field to the magnetic material layer.

8. The switchable liquid crystal display device of claim 7 further comprising a backlight and a control unit which controlling the magnetic field applying means to operate simultaneously with the backlight.

9. The switchable liquid crystal display device of claim 7, wherein a thickness of the magnetic material layer is greater than a skin depth of the magnetic material layer with respect to light incident on the magnetic material layer.

10. The switchable liquid crystal display device of claim 7, wherein the magnetic material layer comprises a soft magnetic material.

11. The switchable liquid crystal display device of claim 7, wherein the magnetic material layer comprises any one selected from titanium, cobalt, iron, cobalt-platinum, and iron-oxide.

12. The switchable liquid crystal display device of claim 7, wherein the magnetic field applying means comprises a flat transparent electrode disposed adjacent to the magnetic material layer and an electric source supplying current to the flat transparent electrode.

13. The switchable liquid crystal display device of claim 12, wherein the flat transparent electrode comprises indium tin oxide (ITO).

14. The switchable liquid crystal display device of claim 12, wherein the flat transparent electrode surrounds the magnetic material layer.

15. The switchable liquid crystal display device of claim 12, wherein the flat transparent electrode is disposed on one of an upper surface and a lower surface of the magnetic material layer.

16. The switchable liquid crystal display device of claim 7, wherein the magnetic field applying means comprises a plurality of wires disposed adjacent to the magnetic material layer at regular intervals and an electric source supplying current to the plurality of wires.

17. The switchable liquid crystal display device of claim 16, wherein the plurality of wires surround the magnetic material layer.

18. The switchable liquid crystal display device of claim 16, wherein the plurality of wires are disposed on one of an upper surface and a lower surface of the magnetic material layer.

19. The switchable liquid crystal display device of claim 1, wherein light incident on the active reflective polarizer is received from at least one of light emitted from a backlight and external light from outside of the switchable liquid crystal display device.

20. The switchable liquid display device of claim 7, wherein if the magnetic field is not applied to the magnetic material layer, the magnetic moments are not uniformly arranged in the same direction so that the magnetic moments are randomly arranged.

21. The switchable liquid crystal display device of claim 1, wherein the active reflective polarizer comprises:
 a magnetic material layer, wherein if the magnetic field is applied to the magnetic material layer, magnetic moments contained within the magnetic material layer are uniformly arranged in a same direction, and if the magnetic field is not applied to the magnetic material layer, the magnetic moments are not uniformly arranged in the same direction; and
 an electrical conductor to apply the magnetic field to the magnetic material layer.

* * * * *